(12) United States Patent
Pflueg

(10) Patent No.: US 6,205,872 B1
(45) Date of Patent: Mar. 27, 2001

(54) BROADBAND VIBRATION SENSOR APPARATUS

(75) Inventor: Christian Pflueg, Ann Arbor, MI (US)

(73) Assignee: Montronix, Inc., Ann Arbor, MI (US)

( * ) Notice: Subject to any disclaimer, the term of this patent is extended or adjusted under 35 U.S.C. 154(b) by 0 days.

(21) Appl. No.: 09/222,451

(22) Filed: Dec. 29, 1998

(51) Int. Cl.[7] .......................... G01D 21/00; G01M 13/00
(52) U.S. Cl. ........................... 73/866.5; 73/593; 73/649
(58) Field of Search .................. 73/510, 514.01, 73/514.34, 593, 570, 431, 866.5, 649, 658

(56) References Cited

U.S. PATENT DOCUMENTS

| | | | |
|---|---|---|---|
| 3,793,627 | * 2/1974 | Darrel et al. | 73/593 |
| 4,615,216 | * 10/1986 | Vykoupil | 73/593 |
| 4,996,878 | * 3/1991 | Kübler | 73/510 |
| 5,038,613 | * 8/1991 | Takenaka et al. | 73/510 |
| 5,263,372 | * 11/1993 | Matsuzaki et al. | 73/593 |
| 5,517,858 | * 5/1996 | Matsuzaki et al. | 73/593 |

FOREIGN PATENT DOCUMENTS

| | | |
|---|---|---|
| 2010 226 | 3/1970 | (DE) . |
| 32 45 505 | 6/1984 | (DE) . |
| 43 42 312 | 12/1993 | (DE) . |
| WO 97/25598 | 7/1997 | (WO) . |

\* cited by examiner

*Primary Examiner*—Richard A. Moller
(74) *Attorney, Agent, or Firm*—Young & Basile, PC

(57) ABSTRACT

A broadband vibration sensor apparatus includes a single housing having at least two vibration sensors disposed in signal communication with a machine contact surface of the housing and a machine on which the housing is mounted. One of the sensors is a piezoelectric element capable of detecting high frequency vibrations and the other sensor is an accelerometer capable of detecting low frequency vibrations. A low impedance transducer is mounted in the housing to convert the output of the piezoelectric element to a low impedance output. An amplifier is connected to the output of the low impedance modified first sensor and the output of the second sensor for amplifying both outputs. A single cable connects the housing to an amplifier housing. Select jumpers are provided for converting the amplifier between a one input, two or four channel amplifier and a two input, two channel amplifier. Bandpass filters with different frequency ranges are replaceably mountable in the amplifier housing to select the bandpass frequency range of each sensor. An RMS to DC converter is coupled to the amplified sensor output.

20 Claims, 5 Drawing Sheets

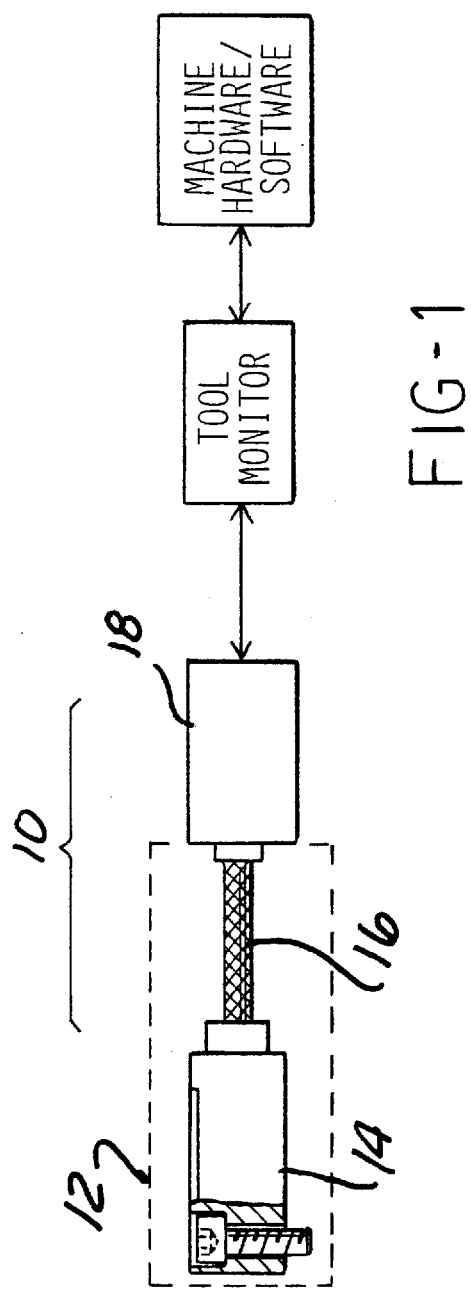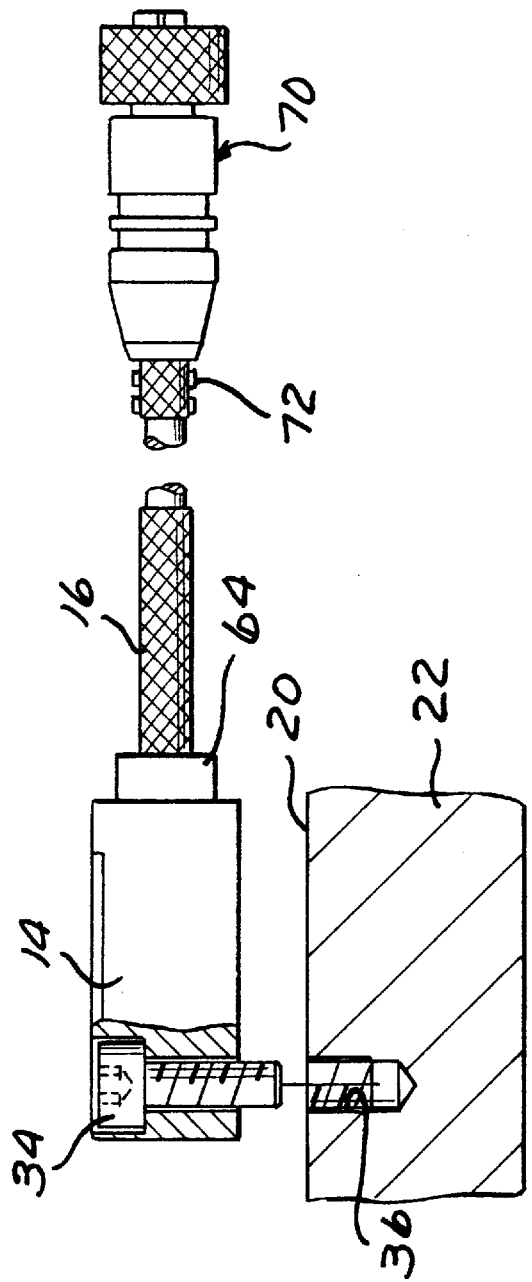

BROADBAND VIBRATION SENSOR APPARATUS

BACKGROUND OF THE INVENTION

1. Field of the Invention

The present invention relates, in general, to vibration sensors and, more particularly, to vibration sensors and related control apparatus for detecting machine tool and process failures.

2. Background Description:

Machine tools, such as drill presses, lathes, milling machines, etc., generate characteristic vibrations during normal operation. A change in the characteristic vibrations resulting from wear, part failure, etc., generate vibrations of different frequencies which can be detected and analyzed to provide an early warning of machine or tool failure so that preventive action can be taken to prevent catastrophic damage to the machine tool and/or workpiece.

Vibrations are generated from continuous cutting operations or from impact events, such as pressing, stamping or forming. Plastic deformation, fracture or friction events commonly found in metal working processes generate acoustic emission signals or bursts. For example, when a tool, such as a very small diameter drill bit or tip, begins to fail, microscopic cracks form on the tool body. These signals propagate quickly and generate distinctive acoustical energy signals in the range of 50 KHz to 500 KHz. Vibrations characteristic of individual cutting tooth disturbances that develop as inserts fail on large diameter multi-tooth milling cutters as well as bearing failure in machine tables, or spindles generate vibrations in a different range of approximately 1 Hz to 10 KHz.

Current technology utilizes separate sensors to detect the machine operating vibration and tool breakage vibration. Typically, a low frequency mechanical vibration sensor, such as an accelerometer, is mounted in a housing which is affixed on a machine tool surface, such as the bed of the machine tool, for example. The higher frequency sensors are typically an acoustic emission sensor, such as piezoelectric element, mounted in a separate housing. Further, the different technologies employed with piezoelectric elements and accelerometers have resulted in each type of sensor being manufactured by a different company.

In use, the vibration sensor, whether an accelerometer or an acoustic emission piezoelectric element sensor, is mounted in a housing and affixed to the machine tool. A short length cable, typically two meters or less, connects the sensor output to an amplifier mounted in a separate housing. The short length cable requires that the amplifier housing be mounted within the machine tool environment in relatively close proximity to the machining operation thereby exposing the amplifier housing to metal shavings, coolant, etc.

A cable connects the output of the amplifier to a remote tool monitoring system which is capable of analyzing a certain frequency range of vibrations associated with abnormal machine operation, drill bit breakage, etc. When a selected frequency is detected associated with abnormal operation or tool breakage, an alarm and/or an output signal is generated by the tool monitor which can be used by the machine control to shut down the machine before further damage results to the machine itself or parts are made which do not meet specifications due to the broken tool, drill bit, etc.

The assignee of the present invention has constructed an amplifier circuit with interchangeable, plug-in, bandpass filter circuits, each of selected frequency ranges, such as 1–10 KHz, 0–600Hz, 30 K–500 KHz, and 200 K–400 KHz. The output from each individual sensor is split into two channels, each having a replaceable bandpass filter circuit of a different frequency range. Thus, in the case of the higher frequency acoustic emission sensor, the higher bandpass frequency circuits are employed. The lower frequency circuits are used for monitoring machine operating vibrations.

However, the previous techniques employed to measure both machine operation and machine tool breakage have not been without disadvantages. The mounting of a single vibration sensor in a single housing necessarily requires two separate housings and the associated labor to mount the housings to the machine in order to detect the high and low frequency vibrations associated with cutting element breakage and abnormal machine operation. Each separate sensor housing also requires a separate cable and a separate amplifier housing thereby requiring additional labor and cost.

Further, the amplifier housing is mounted within the machine tool operating environment due to the short length cable employed between the amplifier housing and the sensor. This short length cable has been used even though impedance transducers have been employed in the sensor housing to generate a low impedance output which would enable cables longer than two meters to be employed between the sensor and amplifier. This results in the need for a repairman to enter the machine tool environment after the machine has been turned off and production halted in order to service the amplifier, such as to change the bandpass frequency circuit in the event of an operation change.

Thus, it would be desirable to provide a vibration sensor apparatus which overcomes the deficiencies found in previously devised vibration sensor devices. It would be desirable to provide a vibration sensor apparatus which has a single sensor housing containing multiple vibration sensors for detecting different vibration frequencies. It would also be desirable to provide a vibration sensor which provides a large contact surface between the machine and the vibration sensors for increased vibration detection. It would also be desirable to provide a vibration sensor apparatus which utilizes longer length cables between the single sensor housing and a single amplifier housing so as to enable the amplifier housing to be mounted remote from the machine tool operating environment for easy access by service personnel without significantly interrupting machine operation.

SUMMARY OF THE INVENTION

The present invention is a broadband vibration sensor apparatus for sensing vibrations generated by abnormalities in machine operation and from machine tool breakage.

The vibration sensor apparatus includes a housing having a machine contact surface. First and second sensors are mounted in the housing for sensing vibrations emitted by the machine. An amplifier means is coupled to and responsive to outputs of the first and second sensors for amplifying the outputs of the first and second sensors.

The first and second sensors, in a preferred embodiment, sense low and high ranges of frequencies, respectively. The first sensor is, by example, an accelerometer adapted for sensing vibration frequencies from about 0.1 Hz to about 10 KHz. The second sensor is, by example, a piezoelectric element capable of sensing vibrations from about 50 KHZ to about 500 KHz.

An impedance transducer mounted in the sensor housing and coupled to the output of the second sensor for converting the output of the second sensor to a low impedance output.

A cavity is formed in the housing. The first and second sensors are coupled in signal communication with the machine contact surface of the housing. Means fixedly mount each of the first and second sensors in signal communication with the machine contact surface of the housing.

The first and second sensors are, in one embodiment, adhesively mounted in signal communication with the machine contact surface of the housing. The adhesive is, by example, an epoxy.

A recess is formed in the housing for receiving one of the first and second sensors. The first or second sensor is fixed in the recess by adhesive or a press fit.

A single multi-conductor cable is connected to and extends from the sensor housing for carrying the first and second sensor outputs.

Means are provided in the amplifier circuit for converting at least one of the first and second sensor outputs into first and second parallel channels. Preferably, both of the first and second sensor outputs are split into separate pairs of first and second parallel channels. Means couple a bandpass filter to each of the first and second channels. Preferably, means releasably couple one of a plurality of bandpass filters, each having a different bandpass frequency range, to each of the first and second channels.

The vibration sensor apparatus of the present invention uniquely combines multiple vibration sensors adapted for detecting different types or vibration frequencies in a single housing to simplify and reduce the cost of mounting vibration sensors to a machine as compared to the multiple sensor housings required for individual vibration sensors used in the prior art. The single sensor housing containing multiple vibration sensors also employs a single cable to the amplifier instead of separate cables, one for each vibration sensor housing and each separate amplifier as in the prior art. This again simplifies and reduces the cost of manufacturing and mounting the vibration sensor apparatus to a machine. The amplifier circuits for both of the vibration sensors are contained a single housing and are connected to the single vibration sensor housing by a single, long length cable made possible by the use of a low impedance transducer in the vibration sensor housing This uniquely enables the single amplifier housing to be mounted exteriorly of the machine tool environment thereby reducing the exposure of the amplifier housing to metal shavings, coolant and other harsh environmental conditions in a machine environment. Since the amplifier is mounted outside of the direct machine tool environment, the replaceable filter circuits employed in the amplifier as well as any necessary repairs to the amplifier itself may be made without entering the machine tool environment or significantly disrupting production.

The selectable means in the amplifier for selectively converting the amplifier circuit between a one input, two or four channel output configuration to a two input, two channel output configuration expands the range of applications on which the vibration sensor apparatus of the present invention may be employed.

BRIEF DESCRIPTION OF THE DRAWING

The various features, advantages and other uses of the present invention will become more apparent by referring to the following detailed description and drawing in which:

FIG. 1 is a block diagram of a vibration sensor apparatus according to the present invention;

FIG. 2 is an elevational view of the vibration sensor housing, cable and cable connector shown in FIG. 1;

DESCRIPTION OF THE PREFERRED EMBODIMENTS

Figure 3:
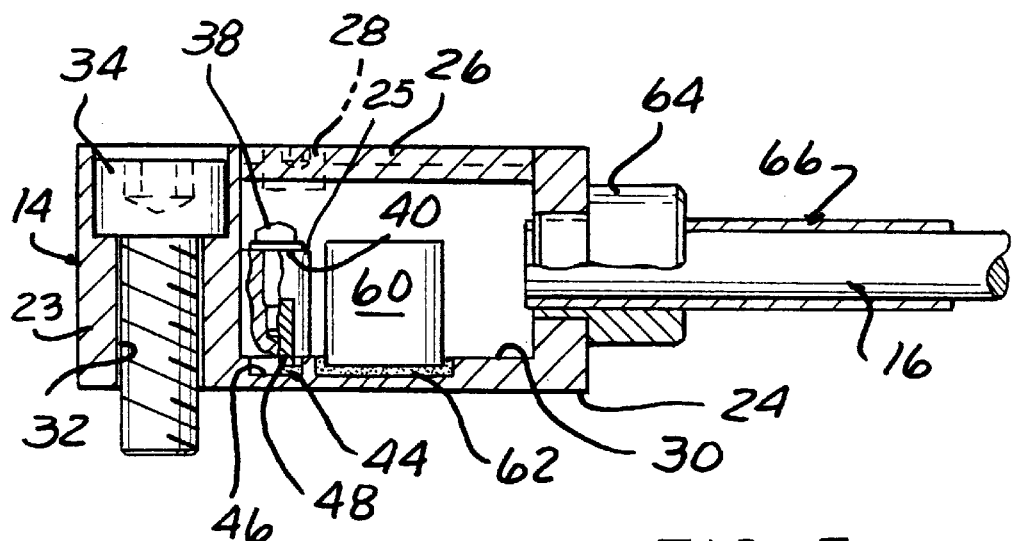
FIG. 3 is a partially cross section, side elevational view of the vibration sensor housing shown in FIGS. 1 and 2.

Referring to FIGS. 1–7B, there is depicted a broadband filter vibration sensor apparatus 10. The vibration sensor apparatus 10 generally includes a vibration sensor assembly 12 formed of a single housing 14 containing one and, preferably two or more individual vibration sensors, and an output cable 16 which connects the output of the vibration sensors in the housing 14 to an amplifier 18. The output of the amplifier 18 is connected to a conventional tool monitor, such as a TS100 monitor sold by Montronix, Inc., which is capable of comparing the amplifier outputs with preset limits and generating signals to machine hardware/software to shut down.

Figure 4:
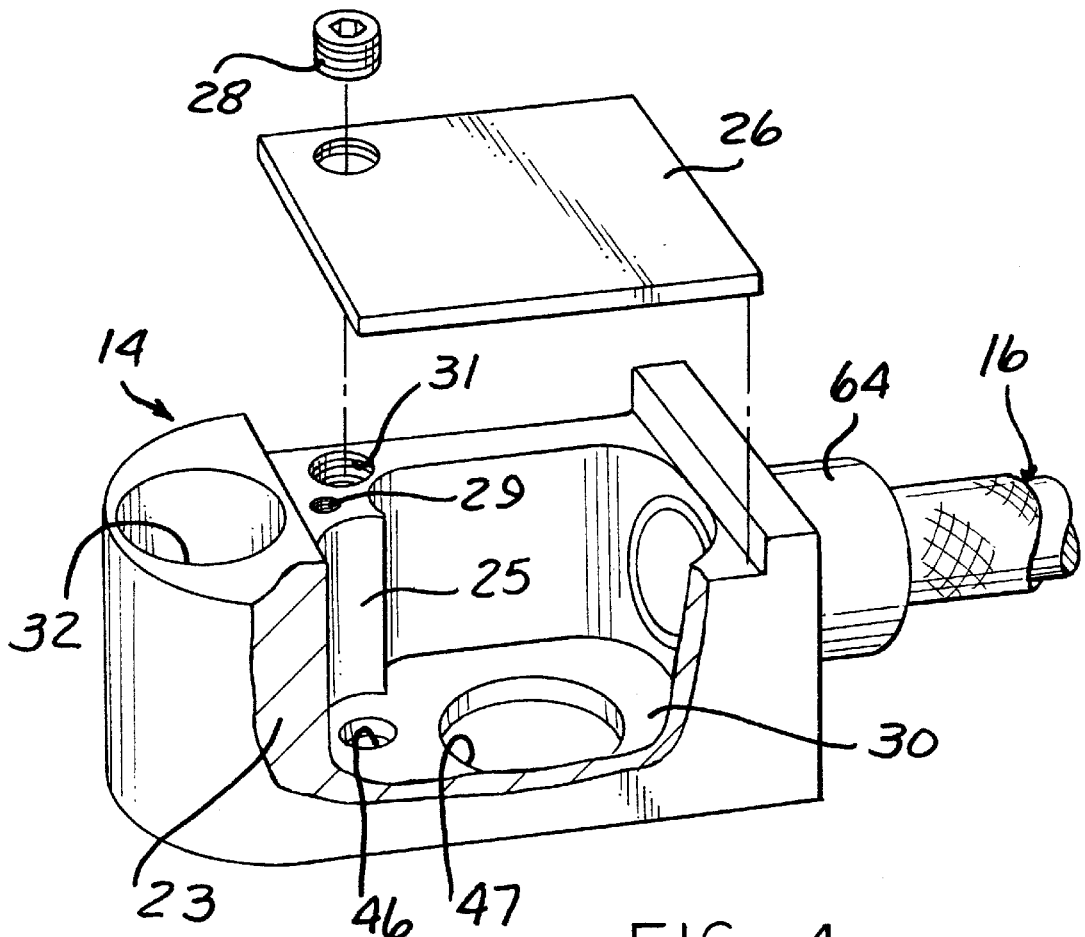
FIG. 4 is a partially broken, perspective view of the vibration sensor housing.

As shown in FIGS. 2–4, the vibration sensor housing 14 is in the form of a one piece cubical body having opposed ends, opposed sides and a generally planar or flat machine mounting surface 24. The vibration sensor housing 14 is adapted to be mounted on a convenient surface 20, such as the bed 22 of a machine with the mounting surface 24 in secure signal communication contact with the machine surface 20. As shown by example in FIG. 3, the machine tool mounting surface 24 is formed as the bottom surface of the housing 14. A removable cover 26 is mountable in the top surface of the housing 14 by means of a fastener, such as set screw 28. After the complete assembly of the vibration sensors and the impedance transducer, described hereafter, within a hollow interior cavity 30 in the housing 14, the cover 26 is mounted on the housing 14 and secured in position by the fastener 28. The fastener 28 may then be potted in place by means of an epoxy or other sealant to non-removably fix the cover 26 to the housing 14.

The housing 14 is preferably formed of a good vibration signal conductor, such as steel. Other materials, such as aluminum, may be employed even though the vibration signal conductivity of aluminum and similar materials is lower than that of steel.

As shown in FIGS. 3 and 4, the housing 14 has a generally solid portion 23 adjacent one end which has a threaded bore 32 extending therethrough. The upper end of the bore 32 is countersunk to enable an enlarged head machine screw or other fastener 34 to be threaded through the bore 32 and securely mount the housing 14 to the bed 22 of the machine by engagement with a threaded bore 36 in the bed 22 of the machine.

The interior cavity 30 in the housing 14 has generally planar sidewalls, by example only. An arcuate boss 25 is formed in one corner of the cavity 30 and has a threaded bore 29 formed therein for receiving an attachment fastener or screw 38. The fastener or screw 38 secures a printed circuit board 40 to the boss 25 in the housing 14. The printed circuit board 40 carries an impedance transducer 42 shown in FIG. 5 and described in greater detail hereafter. A second bore 31 is also formed in the boss 25 for receiving the screw 28 to secure the cover 26 to the housing 14.

In close proximity to, such as directly below the printed circuit board 40, a high frequency responsive vibration sensor, such as an acoustic emission sensor typically in the form of a piezoelectric element 44, is mounted next to an arcuate notch in the boss 25. Preferably, the acoustic emission sensor 44 is in the form of a piezoceramic disc of generally cylindrical configuration as shown in FIG. 3. The piezoceramic element 44, by example, is a piezoceramic element manufactured by ESO Ceramics, model number EC64. The acoustic emission sensor 44 is mounted with one end in fixed, signal communication contact with the inner side 27 of the mounting surface 24 of the housing 14 to receive vibrations transmitted through the mounting surface 24 of the housing 14. By example only, the acoustic emission sensor 44 is mounted in a shallow recess 46 in the inner side 27 of the mounting surface 24. The acoustic emission sensor 44 is fixedly mounted in the recess 46 by any suitable means, such as by a tight press fit or, as shown in FIG. 3, by means of an adhesive 48, such as an epoxy adhesive.

Figure 5:
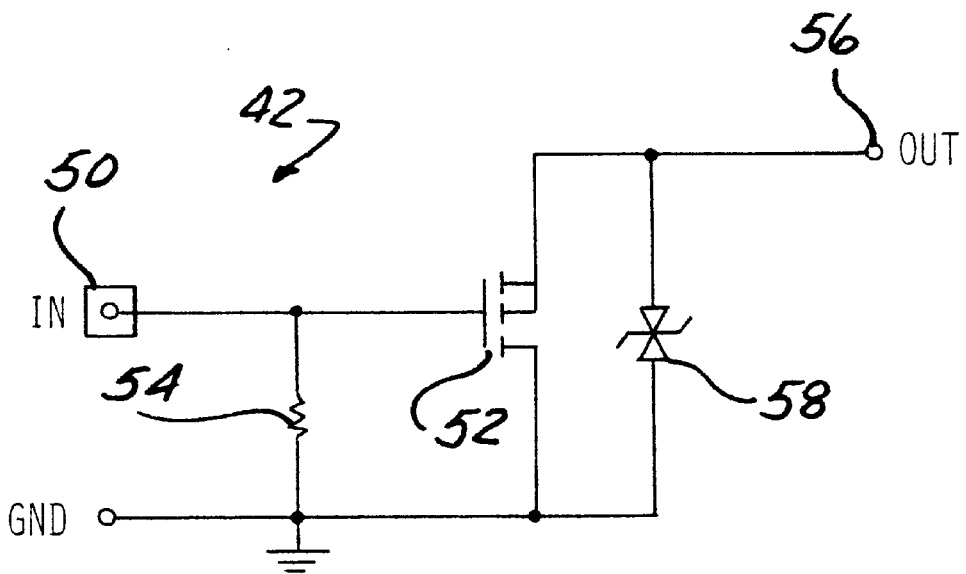
FIG. 5 is a schematic diagram of the impedance transducer mounted in the vibration sensor housing.

The two leads or terminals of the sensor 44 are connected or soldered to terminals or pads on the printed circuit board 40. One terminal of the acoustic emission sensor 44 is connected to ground as shown in FIG. 5. The other terminal from the sensor 44 is connected to an input pad or terminal 50 on the printed circuit board 40 which causes an impedance transducer. A mosfet transistor 52 having a resistor 54 connected across the gate and between the input pad 50 and ground has its low impedance output connected to an output pad or terminal 56. A Zener diode 58 is connected between the output pad 56 and ground to provide over-voltage protection for the transistor 52. Input power from the cable 16, as described hereafter, is supplied to one terminal of the sensor 44 along with the ground connection to the printed circuit board 40 as shown in FIG. 5.

The mosfet transistor 52 converts the high impedance output of the piezoceramic element forming the acoustic emission sensor 44 to a low impedance output thereby enabling a long length cable 16 to be employed between the sensor housing 14 and the amplifier 18.

A low frequency responsive vibration sensor 60 is also mounted in the housing 14 by means of a press fit or adhesive 62 in a shallow recess 47 formed in the inner surface of the mounting surface 24 of the housing 14. Although any low frequency vibration sensor may be employed for the sensor 60, in a preferred embodiment, the low frequency vibration sensor 60 is an accelerometer element, such as one sold by IMI as model number 602A01.

The sensor or accelerometer 60 has three leads, one connected to ground on the printed circuit board 40, one receiving input power through the cable 16 and the last being a sensor output through the cable 16.

The cable 16 is preferably a cable suitable for use in a machine tool environment and is sealed from the influx of fluid as well as being electrically shielded. The cable 16 is provided with a metal overbraid 66 to prevent damage to the cable 16. A conventional cable connector 64 is employed to mount one end of the cable 16 in a bore at one end of the vibration sensor housing 14.

As shown in FIG. 2, a conventional plug 70 is mounted to the opposite end of the cable 16 by a conventional split ring cable clamp or ferrule 72.

Figure 6:
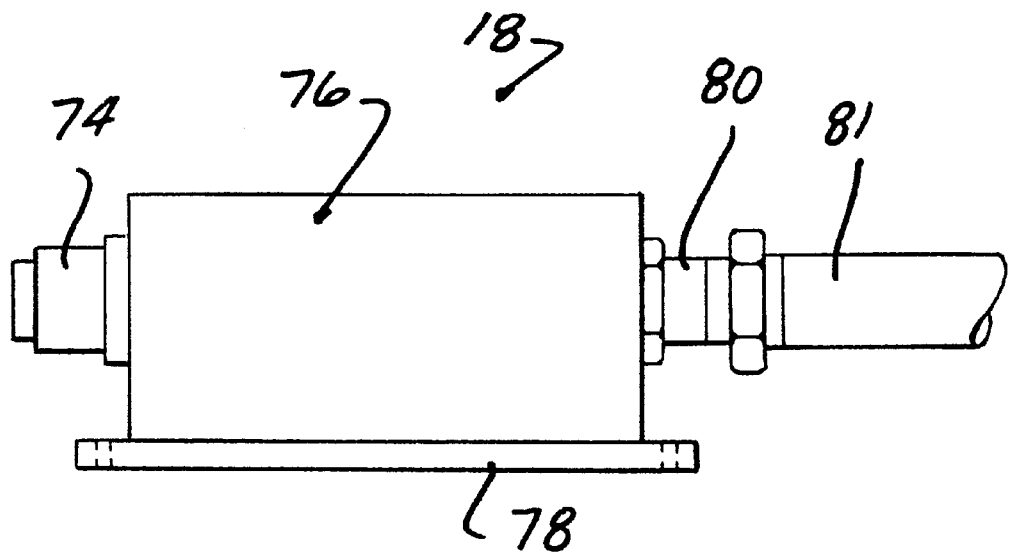
FIG. 6 is a side elevational view of the amplifier housing shown in FIG. 1.

The plug 70 is securable to a mating plug or connector 74 mounted in a housing 76, shown in FIG. 6 which is part of the amplifier 18. The housing 76 is in the form of a generally rectangular enclosure with sidewalls, a top wall and an enlarged bottom mounting flange 78 which is securable through fasteners and apertures to a convenient mounting surface in the machine. An output connector 80 projects from the housing 76 for supplying output signals from the amplifier 18 to a remote tool monitor.

Figure 7A:
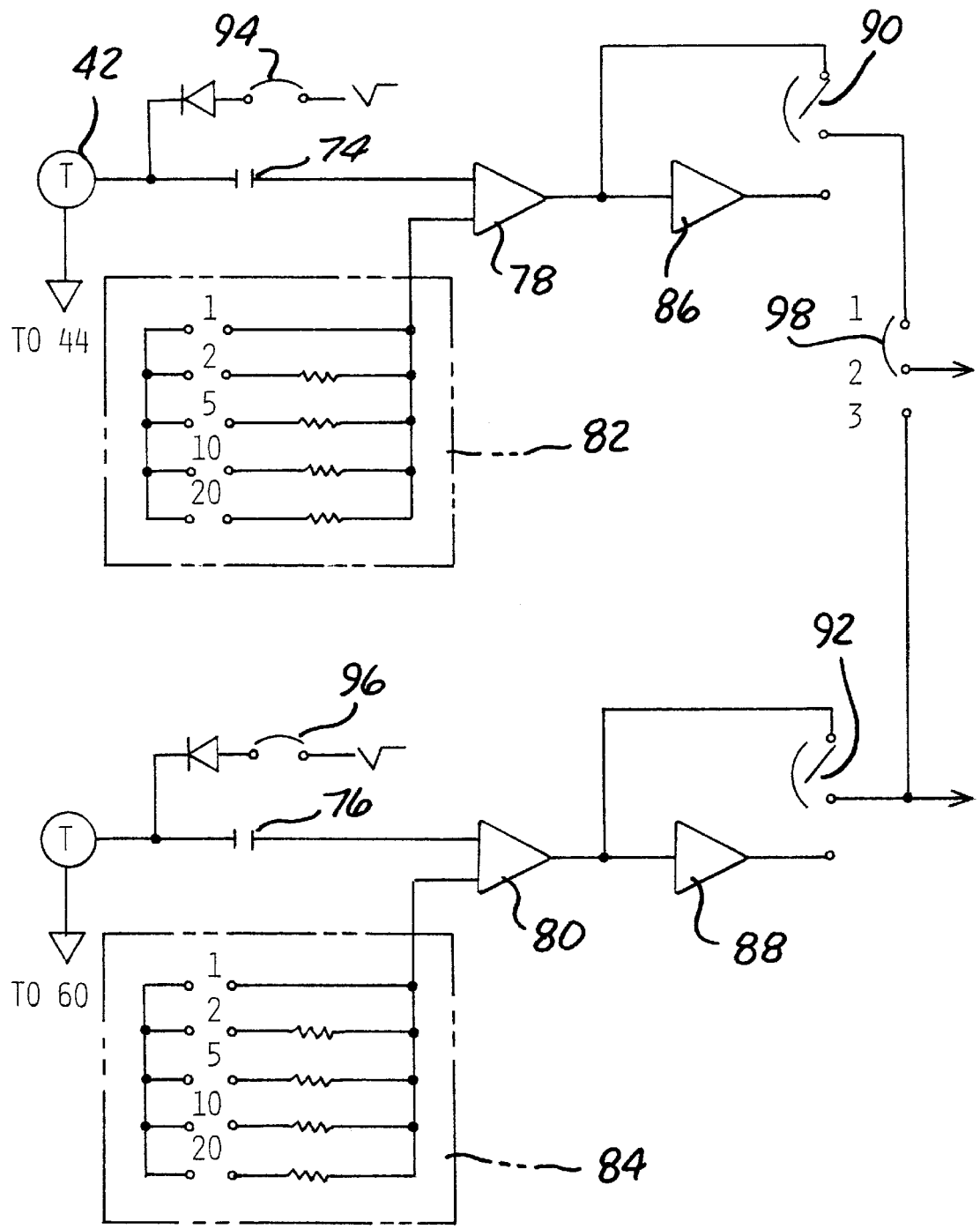
FIGS. 7A and 7B are block and schematic diagrams of the amplifier circuit employed in the vibration sensor apparatus of the present invention.
Figure 7B:
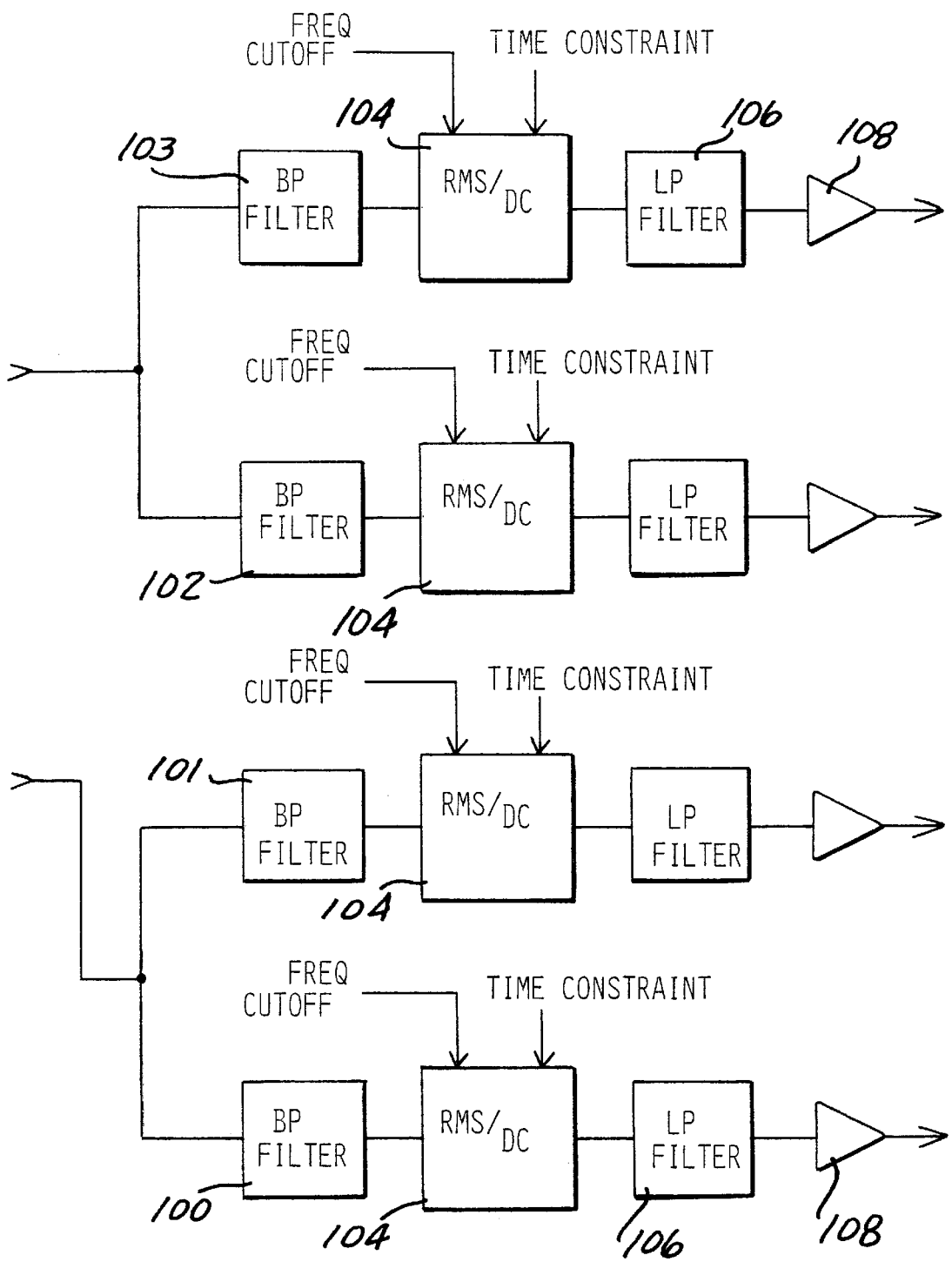

A printed circuit board, not shown, is mounted in the housing 76 of the amplifier 18 and contains amplifier circuitry shown in FIGS. 7A, both occurrences and 7B. As shown in FIG. 7A and 7B, dual channels or circuits are provided, one for each sensor 44 and 60. A constant current source approximately supplies four milliamp current to each of the sensors 44 and 60. The output of the sensors 44 and 60, including the output from the low impedance transducer 42 coupled to the acoustic emission sensor 44, is AC coupled by capacitors 74 and 76 to separate amplifiers 78 and 80. A selectable gain circuit 82 is provided for the amplifier 78 and a selectable gain circuit 84 is connected to the amplifier 80 to enable the gain of each amplifier 78 and 80 to be individually selected as needed depending upon the signal transmission characteristics of the particular machine application, the individual sensors 44 and 60, etc. Jumpers are coupled to the appropriate gain resistor in the gain circuit 82 or 84 to select the desired gain.

The amplifier 78 provides a first stage amplification of the output of the sensor 44. A selectable second stage amplification of the output of the first amplifier 78 may be provided by amplifier 86 which is selectively introduced into the circuit by means of a jumper 90. When the jumper 90 is placed in one position between appropriate terminals, only the first stage amplifier 78 is coupled to the amplifier circuit. When the jumper 90 is placed in a second position, the second stage amplifier 86 is connected in series with the output of the first stage amplifier 78 thereby providing a multiplication factor of 10, for example, to the gain selected from the gain circuit 82 coupled to the amplifier 78.

A similar second stage gain amplifier 88 and jumper 92 is also provided for the amplifier 80 to selectively amplify the output of the vibration sensor 60.

Although the vibration sensor apparatus 10 of the present invention is preferably employed with two sensors 44 and 60 in the housing 14, the apparatus 10 is also usable with only a single sensor, such as either the high frequency vibration sensor 44 or the low frequency vibration sensor 60. As shown in FIG. 7A, two select jumpers 94 and 96 are connected between the constant current source and each sensor 44 and 60 so as to selectively activate one or both of the sensors 44 and 60.

The outputs of the amplifiers 78, 86, 80, 88 are connected to an amplifier type select jumper 98 which is selectively implacable on the printed circuit board between either pins 1 and 2 or pins 1 and 3. When the jumper 98 is connected between pins 1 and 2, the amplifier 18, including both amplifiers 78 and 80, is configured as a two input, two channel device. When the jumper 98 is connected across pins 2 and 3, the amplifier 18 includes only amplifier 80 and operates as a single input, four channel amplifier. In the case of a single sensor application, amplifier 80 is employed and the constant current source is connected to the single sensor 44 or 60 mounted in the sensor housing 14.

According to a preferred embodiment, four bandpass filter circuits 100, 101, 102 and 103 are mounted on the printed circuit board in the amplifier 18. Typically, each bandpass filter circuit 100–103 is implemented in the form of a header or pin connector mounted on the printed circuit board and operably coupled to the amplifier circuit as shown in FIG.

7B. A removable printed circuit board containing an individual bandpass filter circuit is connectable to the header or pin connector thereby enabling the frequency range of any of bandpass filter 100–103 to be changed to meet the needs of a particular sensor application. The individual bandpass filters 100–103 may be any conventional bandpass filter, such as Butterworth filter, fourth order filter, Bessell filter, etc. The frequency range of each bandpass filter 100–103 may also be tailored by means of suitable circuit design to provide any desired bandpass filter range. As noted above, the bandpass filters 100–103 could include, by example only, filters having a bandpass range generally between about 0.1 Hz to about 500 KHz, such as 1–10 kHz, 0–600 Hz, 30 K–500 KHz and 200 K–400 KHz. In this configuration of filters 100–103, the two low frequency filters would be employed with the low frequency vibration sensor 60; while the higher bandpass frequency range filters would be employed with the acoustic emission sensor 44.

As shown in 7B, the output of the amplifiers 80 and 88, which has been described by example only as being coupled to the sensor 60, is connected to the two parallel connected bandpass filters 100 and 101. The amplifiers 80 and 88 are also connected to the terminal 3 of jumper 98. When the jumper 98 is connected between pins or terminals 2 and 3, the output of the amplifiers 80 and 82 is also connected to the two parallel connected bandpass filters 102 and 103. In this configuration, a single vibration sensor, such as vibration sensor 60 in the example described above, is coupled to the amplifiers 80 and 88, whose output is connected to the four bandpass filters 100–103, each capable of detecting vibrations within a specified frequency range, as set forth above.

Alternately, when the jumper 98 is connected between the terminals or pins 1 and 2, the output of the other amplifiers 78 and 86 is connected to the two bandpass filters 102 and 103. The output of the amplifiers 80 and 88 remains connected to the bandpass filters 100 and 102. This provides a two input (two separate outputs from the sensors 44 and 60) to two discrete channels 100 and 101 for the sensor 60 and channels 102 and 103 for the sensor 44.

As shown in FIG. 7B, the output of each bandpass filter circuit 100–103 is connected to a RMS-to-DC converter 104 sold by Analog Devices. The cutoff frequency of each bandpass filter 100 and 102 may be individually selected by means of jumpers on the printed circuit board which couple capacitors to an input of each converter 104. In addition, the time constraint for each converter 104 is also selectable by means of individual jumpers which connect one of a number of different capacitors to each converter 104. In this manner, the cutoff frequency of the output of each bandpass filter 100–103 is selected and converted to a DC value by the converter 104. The output of the converter 104 is coupled through a low pass filter 106 which smooths out the coarse RMS output of the converter 104. The output of the low pass filter 106 is coupled to a buffer 108 before passing to an output connector on the printed circuit board which has leads connected to conductors in an output cable 81, shown in FIG. 6, which extends to the remote tool monitor.

In summary, there has been disclosed a unique broadband vibration sensor apparatus which has multiple vibration sensors in a single housing to simplify the mounting of the vibration sensor in a machine tool as well enabling different vibration frequencies to be detected to monitor machine and machine tool operation. The use of a single vibration sensor housing containing multiple vibration sensors affords the use of a single cable to a single remote amplifier which, due to the longer length cable employed with the present apparatus, may be located outside of the machine tool environment so as to avoid exposure to metal shavings, coolant, etc. The amplifier circuit is arranged as a selectable one input, two or four channel output device or a two input, two channel output device.

What is claimed is:

1. A vibration sensor apparatus for sensing low frequency vibrations emitted by a machine or a machine tool and high frequency acoustic emissions from deformation in a machine or a machine tool and transmitted as high frequency sound comprising:

a housing having a machine tool contact surface;

first and second sensors mounted in the housing for sensing vibrations emitted by the machine and machine tool, each first and second sensor generating an output proportional to a sensed vibration, the first sensor responsive to low frequency machine and machine tool vibrations, the second sensor responsive to high frequency acoustic emissions from a machine and a machine tool; and amplifier means, mounted in the housing and responsive to outputs of the first and second sensors, for amplifying the outputs of the first and second sensors.

2. The vibration sensor apparatus of claim 1 wherein the first sensor is an accelerometer.

3. The vibration sensor apparatus of claim 2 wherein the accelerometer senses vibration frequencies between about 0.1 Hz to about 600 Hz.

4. The vibration sensor apparatus of claim 1 wherein the second sensor is a piezoelectric element.

5. The vibration sensor apparatus of claim 4 wherein the piezoelectric element senses vibration frequencies between about 50 KHz and about 500 KHz.

6. The vibration sensor apparatus of claim 1 further comprising:

a single multi-conductor cable connected to and extending from the housing for carrying the outputs of the first and second sensors.

7. The vibration sensor apparatus of claim 1 further comprising:

means for converting both of the first and second sensor outputs into separate pairs of first and second parallel channels.

8. The vibration sensor apparatus of claim 1 further comprising:

means for converting at least one of the first and second sensor outputs into first and second parallel channels.

9. The vibration sensor apparatus of claim 8 further comprising:

means for coupling a bandpass filter to each of the first and second channels.

10. The vibration sensor apparatus of claim 9 wherein each bandpass filter comprises:

a plurality of filters, each having a different bandpass frequency range.

11. The vibration sensor apparatus of claim 1 further comprising:

means for fixedly mounting each of the first and second sensors in signal communication with the machine contact surface of the housing.

12. The vibration sensor apparatus of claim 11 wherein:

the first sensor is an accelerometer; and the second sensor is piezoceramic sensor.

13. The vibration sensor apparatus of claim 1 further comprising:

an impedance transducer mounted in the housing and coupled to the output of the second sensor for converting the output of the second sensor to a low impedance output.

14. The vibration sensor apparatus of claim 1 further comprising:

a cavity formed in the housing; and the first and second sensors mounted in the cavity in vibration signal communication with the machine contact surface of the housing.

15. The vibration sensor apparatus of claim 14 wherein the first and second sensors are adhesively fixedly mounted in signal communication with the machine contact surface of the housing.

16. The vibration sensor apparatus of claim 15 wherein the adhesive is an epoxy.

17. The vibration sensor apparatus of claim 14 further comprising:

a recess formed in the housing for receiving one of the first and second sensors.

18. The vibration sensor apparatus of claim 17 further comprising:

an adhesive bonding one of the first and second sensors in the recess in the housing.

19. The vibration sensor apparatus of claim 1 wherein the first sensor senses vibration frequencies between about 0.1 Hz to about 600 Hz.

20. The vibration sensor apparatus of claim 1 wherein the second sensor senses vibration frequencies between about 50 KHz and about 500 KHz.

* * * * *